(12) United States Patent
Bradley

(10) Patent No.: US 8,381,682 B2
(45) Date of Patent: Feb. 26, 2013

(54) CASTLE BIRDFEEDER SYSTEMS

(76) Inventor: Robert Ernest Bradley, Flagler Beach, FL (US)

(*) Notice: Subject to any disclaimer, the term of this patent is extended or adjusted under 35 U.S.C. 154(b) by 31 days.

(21) Appl. No.: 13/187,474

(22) Filed: Jul. 20, 2011

(65) Prior Publication Data
US 2012/0037078 A1 Feb. 16, 2012

Related U.S. Application Data

(60) Provisional application No. 61/373,767, filed on Aug. 13, 2010.

(51) Int. Cl.
*A01K 5/00* (2006.01)

(52) U.S. Cl. ............ 119/51.5; 119/52.2; 119/57.8; 119/429

(58) Field of Classification Search ............ 119/51.5, 119/52.2, 57.8, 429, 428, 430, 482
See application file for complete search history.

(56) References Cited

U.S. PATENT DOCUMENTS

| 3,496,913 | A | * | 2/1970 | Vail | 119/432 |
| 5,463,980 | A | * | 11/1995 | Rasmussen | 119/57.1 |
| 5,471,951 | A | * | 12/1995 | Collins | 119/57.9 |
| 5,937,788 | A | | 8/1999 | Boyd | |
| 5,943,981 | A | | 8/1999 | Chrisco | |
| 6,516,750 | B1 | * | 2/2003 | Heinzeroth | 119/428 |
| 6,584,933 | B1 | | 7/2003 | Stone | |
| 6,684,811 | B2 | | 2/2004 | Rich et al. | |
| 7,117,819 | B2 | * | 10/2006 | Marshall | 119/428 |
| 7,540,262 | B2 | | 6/2009 | Kuelbs | |
| 2009/0277393 | A1 | | 11/2009 | Kuelbs et al. | |

* cited by examiner

*Primary Examiner* — Yvonne Abbott
(74) *Attorney, Agent, or Firm* — RG Patent Consulting LLC

(57) ABSTRACT

The Castle Birdfeeder provides an efficient method for feeding wild birds and conserving bird seed. The device may comprise a birdfeeder shaped like a castle containing removable components. The base of the invention can be a rectangular and one-quarter inch deep to hold water, be used as a moat, in which birds can drink, clean and cool themselves. The castle may include perch doors on each side that fold up and down like a castle door. Birds can stand on these perch doors while poking their beaks through the round windows in the castle side to access seed contained in a seed holder made to fit within the dimensions of the castle. As birds eat, any excess seeds may fall from the seed holder to the seed catcher placed directly below. The design of this invention may also prevent squirrels and other animals from accessing and stealing bird food.

20 Claims, 7 Drawing Sheets

CASTLE BIRDFEEDER SYSTEMS

CROSS-REFERENCE TO RELATED APPLICATION

The present application is related to and claims priority from prior provisional application Ser. No. 61/373,767, filed Aug. 13, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of bird feeders and more specifically relates to a feed-saver solar powered birdfeeder.

2. Description of the Related Art

Many consumers use birdfeeders to feed wild birds that pass by or nest near their homes. Although an enjoyable hobby, bird seed can be a high expense for consumers. Birds can be messy eaters and may spill or toss seeds to the ground. Woodpeckers, for example, may toss several seeds aside before finding a particularly appetizing seed. This may lead to a high volume of wasted seed, requiring users to frequently replace the wasted food with new seed. Other animals such as squirrels may waste seed and may destroy bird feeders. This is inconvenient and poses unnecessary expenses to consumers.

Various attempts have been made to solve the above-mentioned problems such as those found in U.S. Pat. and Pub. Nos. 2009/0277393; 6,684,811; 5,943,981; 6,584,933; 7,540,262; and 5,937,788. This prior art is representative of birdfeeders and birdhouses. None of the above inventions and patents, taken either singly or in combination, is seen to describe the invention as claimed.

Ideally, castle birdfeeder systems should be user-friendly and, yet would operate reliably and be manufactured at a modest expense. Thus, a need exists for a reliable castle birdfeeder system to feed wild birds in an effective, cost efficient manner and to avoid the above-mentioned problems.

BRIEF SUMMARY OF THE INVENTION

In view of the foregoing disadvantages inherent in the known bird feeders art, the present invention provides a novel castle birdfeeder system. The general purpose of the present invention, which will be described subsequently in greater detail is to provide a feed-saver solar powered illuminated birdfeeder.

Castle Birdfeeder of the present invention allows consumers to feed wild birds in an effective, cost efficient manner. This innovative product features a birdfeeder that is shaped like a castle and preferably contains multiple removable compartments. A seed catcher included in the base of the unit is designed to catch excess birdseed that may otherwise be lost and wasted. This allows users to collect the excess seeds and return them to the seed-holder compartment. The retrieved seeds can be supplemented with fresh seeds, virtually eliminating the need for users to replace the existing seeds with a new batch of entirely fresh seeds. Consumers may enjoy using this product to reduce the amount of money spent on new bird seed.

A Castle Birdfeeder, feed-saver birdfeeder is disclosed herein preferably comprising: a housing assembly with multiple removable compartments mostly comprising having a seed holder, seed catcher and solar roof, a plurality of hinged perch doors; a plurality of (preferably 1 inch) seed access holes surrounded by squirrel-proof metal-ring(s) (the squirrel-proof ring preferably comprises a metal rod); a mounted solar panel; at least one illuminator; at least one squirrel-proof ring. The device may further comprise at least one hanger for hanging the feed-saver birdfeeder in a suspended position (in certain embodiments); at least one awning over each of the seed access holes (and optionally the upper 'windows'—that don't open). The awnings over each of the seed access holes substantially prevent water from entering the seed access holes. The removable (solar) roof, and the seed catcher and the seed holder define an inner volume of the housing assembly; wherein the housing assembly is transparent and comprises a stone castle profile.

The mounted solar (roof) panel and illuminator(s) are in electrical communication to provide illumination to help birds locate seeds during periods of darkness. The squirrel-proof ring(s) are located around a periphery of the seed access holes (windows) to substantially prevent squirrels from chewing the windows to access and steal the seeds.

The birds may land on and rest on the hinged perch doors to access the seeds though the windows to the seed holder, one half inch inside the castle. The hinged perch doors may be rotated to a down-position to provide at least one rest for the birds while eating seeds from the seed access holes. The hinged perch doors are able to be rotated to an up-position to substantially prevent access to the seed access holes. The moat-base is preferably rectangular and one quarter inch deep to hold water for the birds. The moat-base, hinged perch doors, and the seed catcher (wider in profile than seed collector to catch seeds), comprise seed-savers by substantially preventing most seeds from falling on the ground. The moat-base comprises a seed collector when the seeds are dropped by birds.

The removable (solar) roof provides a weather-proof enclosure to substantially prevent water from entering the Castle. The seed holder comprises a cross-shaped opening about one quarter inch in size on all parts of the cross. Birds access the seeds by reaching through the windows, the one half inch space, to the seed holder pulling out seeds for consumption. Any dropped seeds are caught in the seed catcher inside bottom of the castle. The Castle Birdfeeder comprises a triple seed-saver; wherein the birds are able to eat seeds and loss of the seeds is substantially lower by the Castle Birdfeeder. Embodiments of the feed-saver birdfeeder are disassemblable for cleaning.

The present invention holds significant improvements and serves as a castle birdfeeder system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, castle birdfeeder systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a birdfeeder device and more particularly to a feed-saver solar powered birdfeeder that may illuminate to feed wild birds in an effective, and cost efficient manner.

Figure 1:
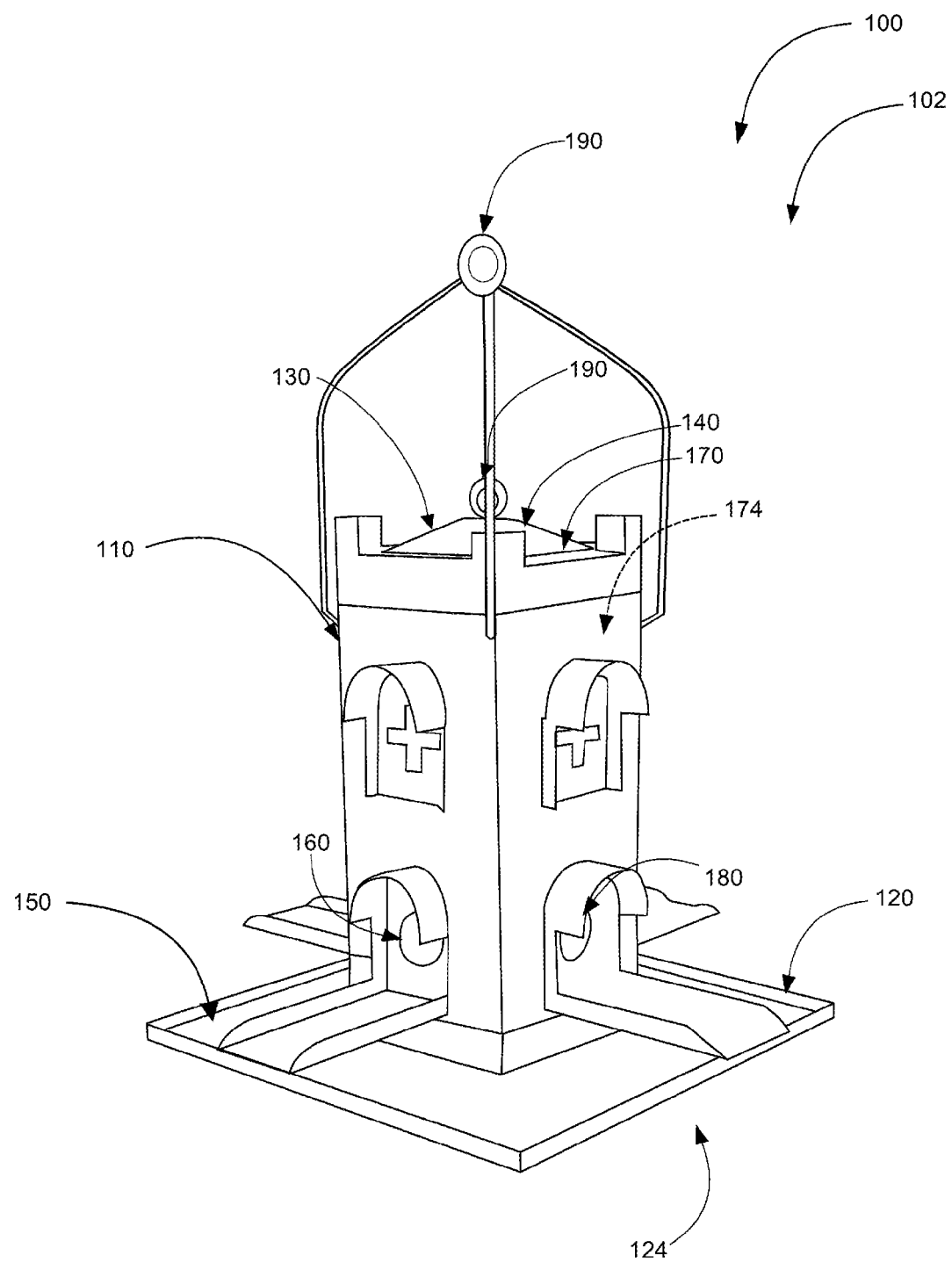
FIG. 1 shows a perspective view illustrating castle birdfeeder systems in an 'in-use' condition according to an embodiment of the present invention.
Figure 2:
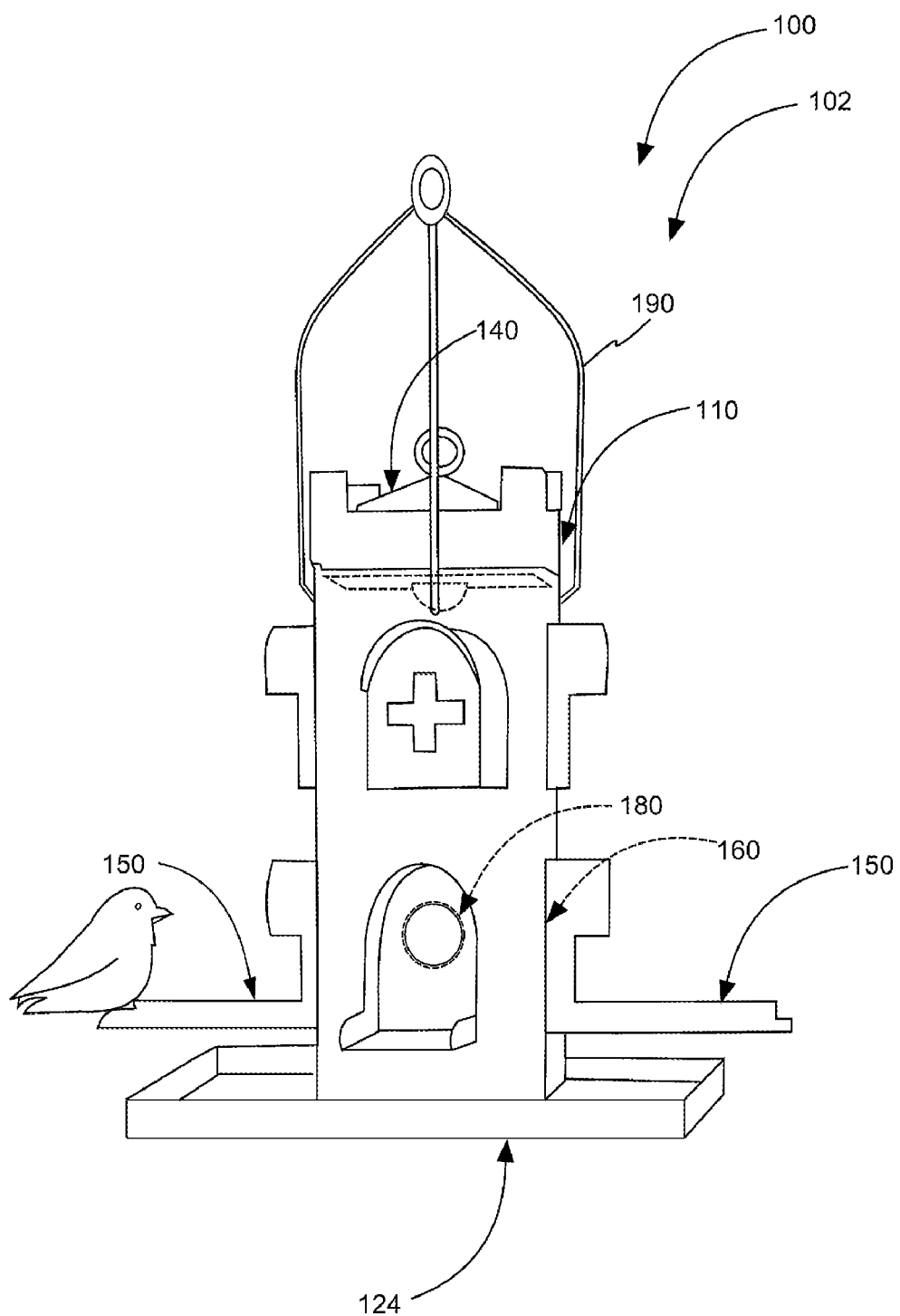
FIG. 2 is a perspective view illustrating a feed-saver birdfeeder of the castle birdfeeder systems according to an embodiment of the present invention of FIG. 1.
Figure 3:
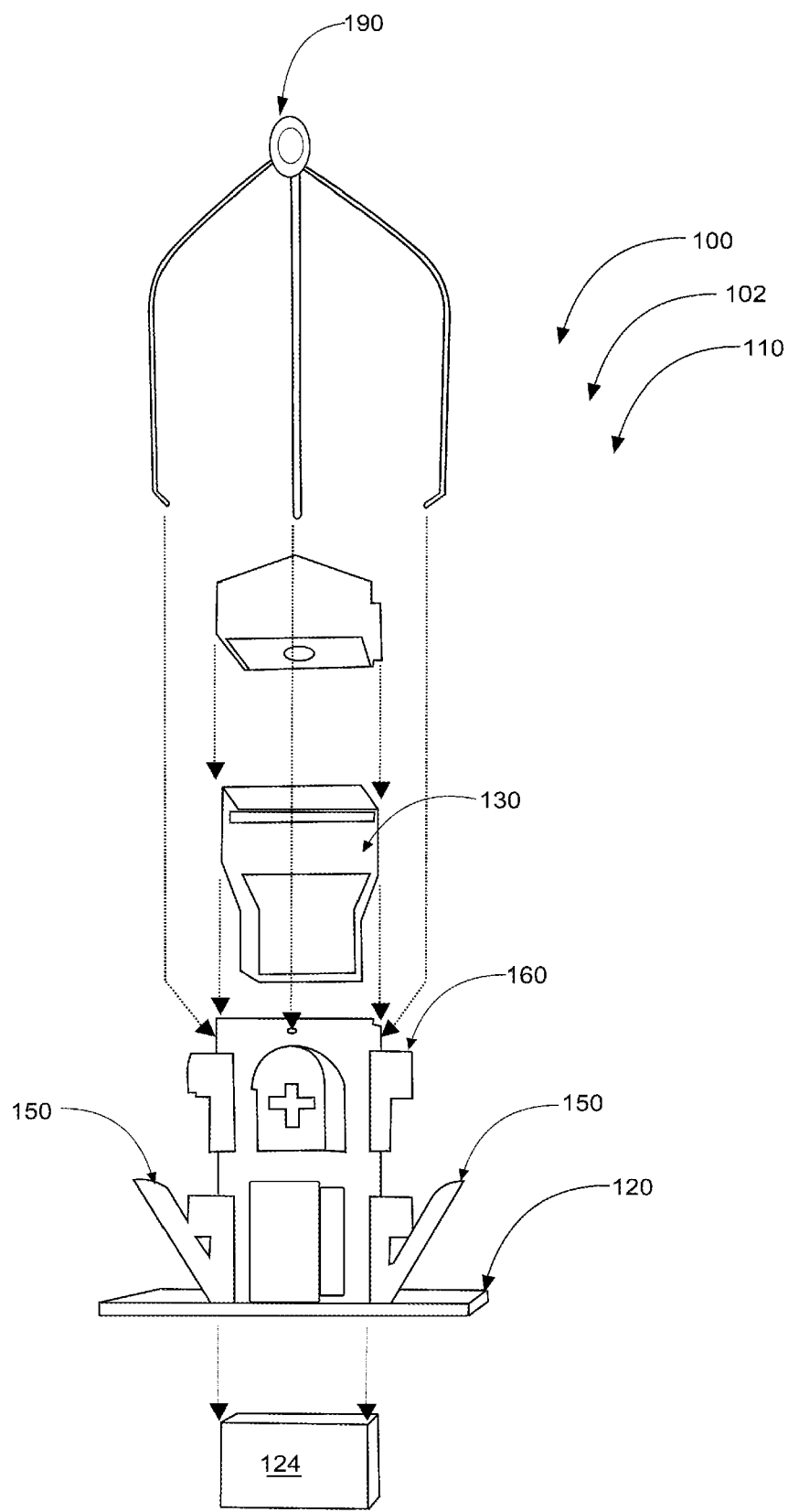
FIG. 3 is an exploded view illustrating another view of the feed-saver birdfeeder of the castle birdfeeder systems according to an embodiment of the present invention of FIG. 1.
Figure 4:
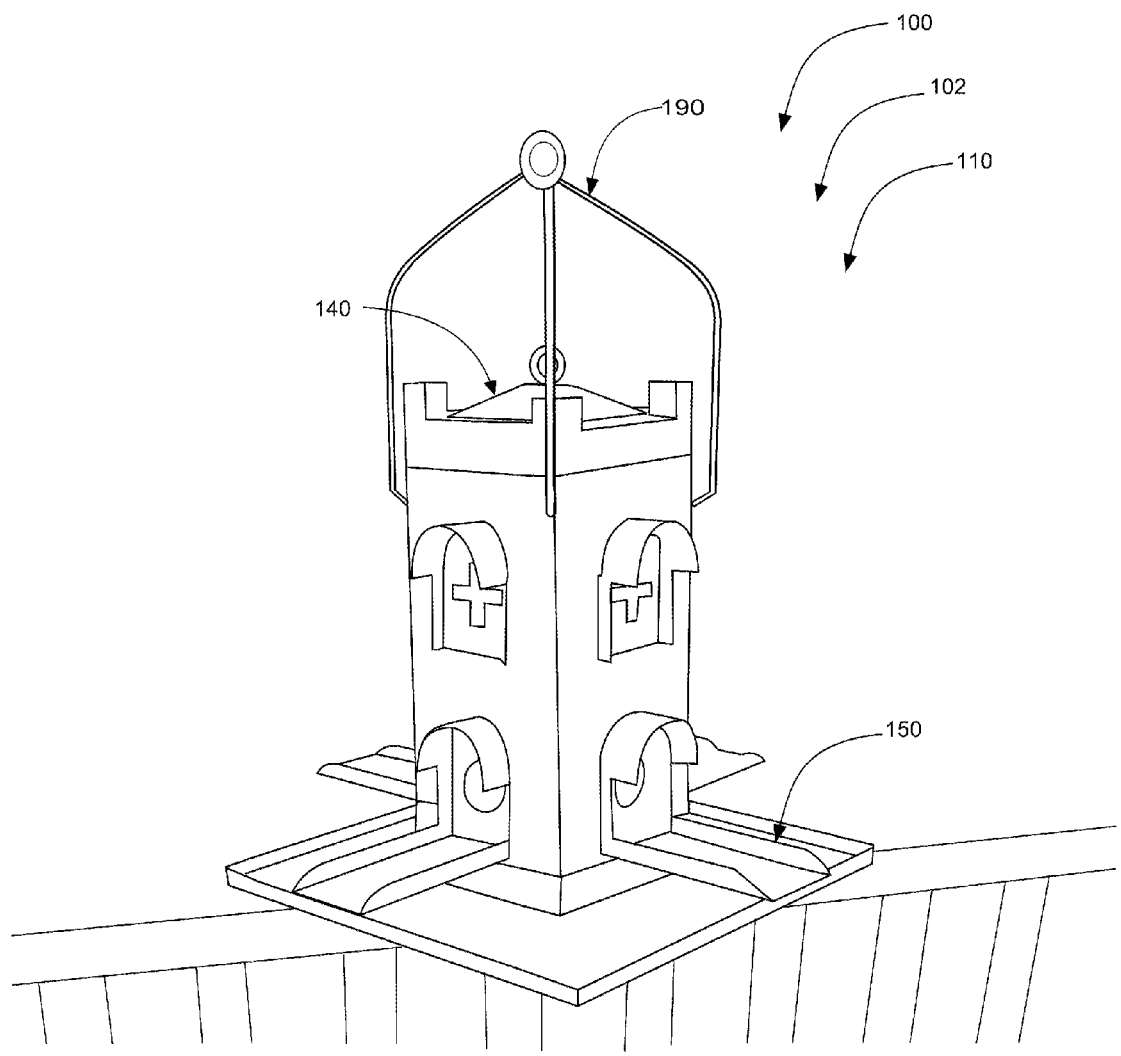
FIG. 4 is a perspective view illustrating yet another view of the feed-saver birdfeeder of the castle birdfeeder systems according to an embodiment of the present invention of FIG. 1.
Figure 5:
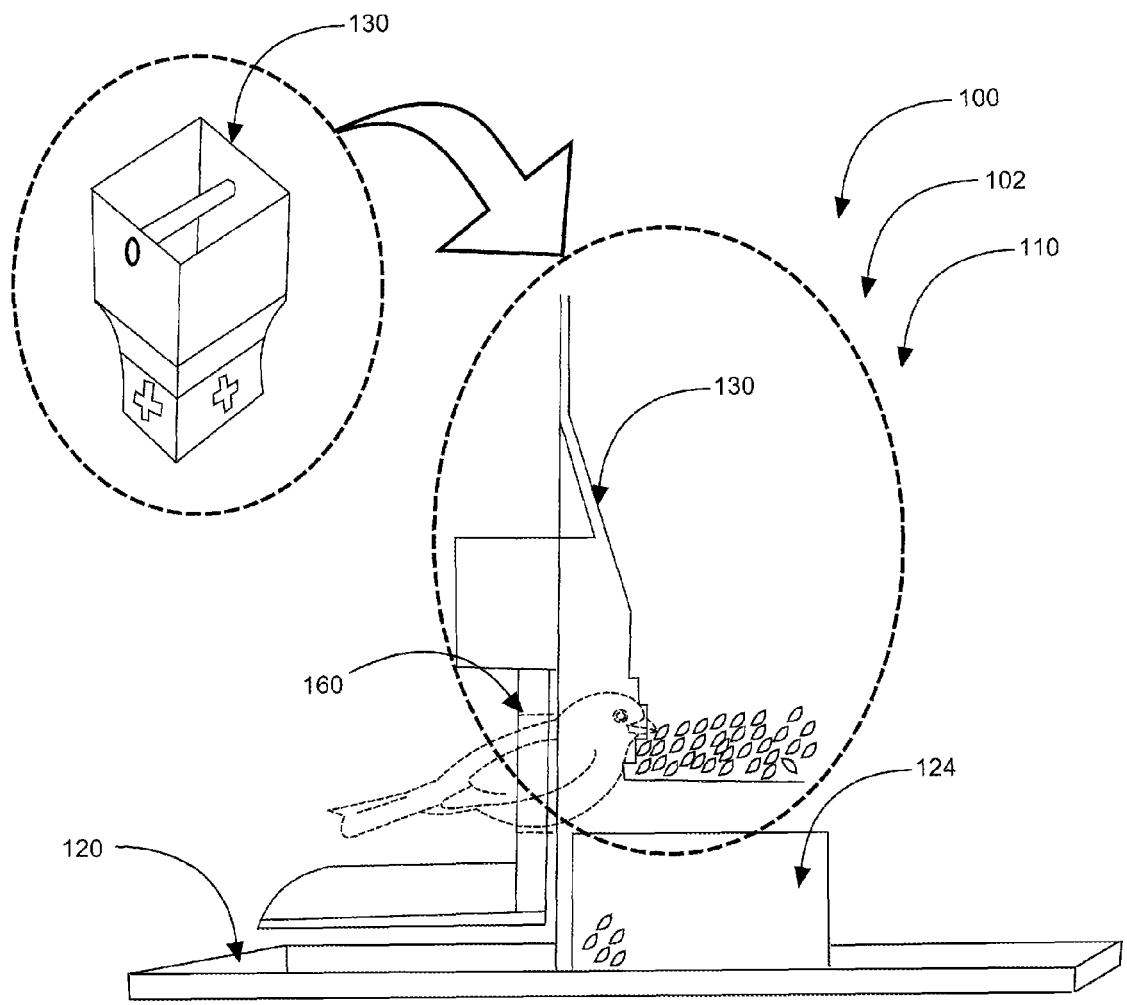
FIG. 5 is a perspective view illustrating the feed-saver birdfeeder illuminated for night use (in-use) according to an embodiment of the present invention of FIG. 1.
Figure 6:
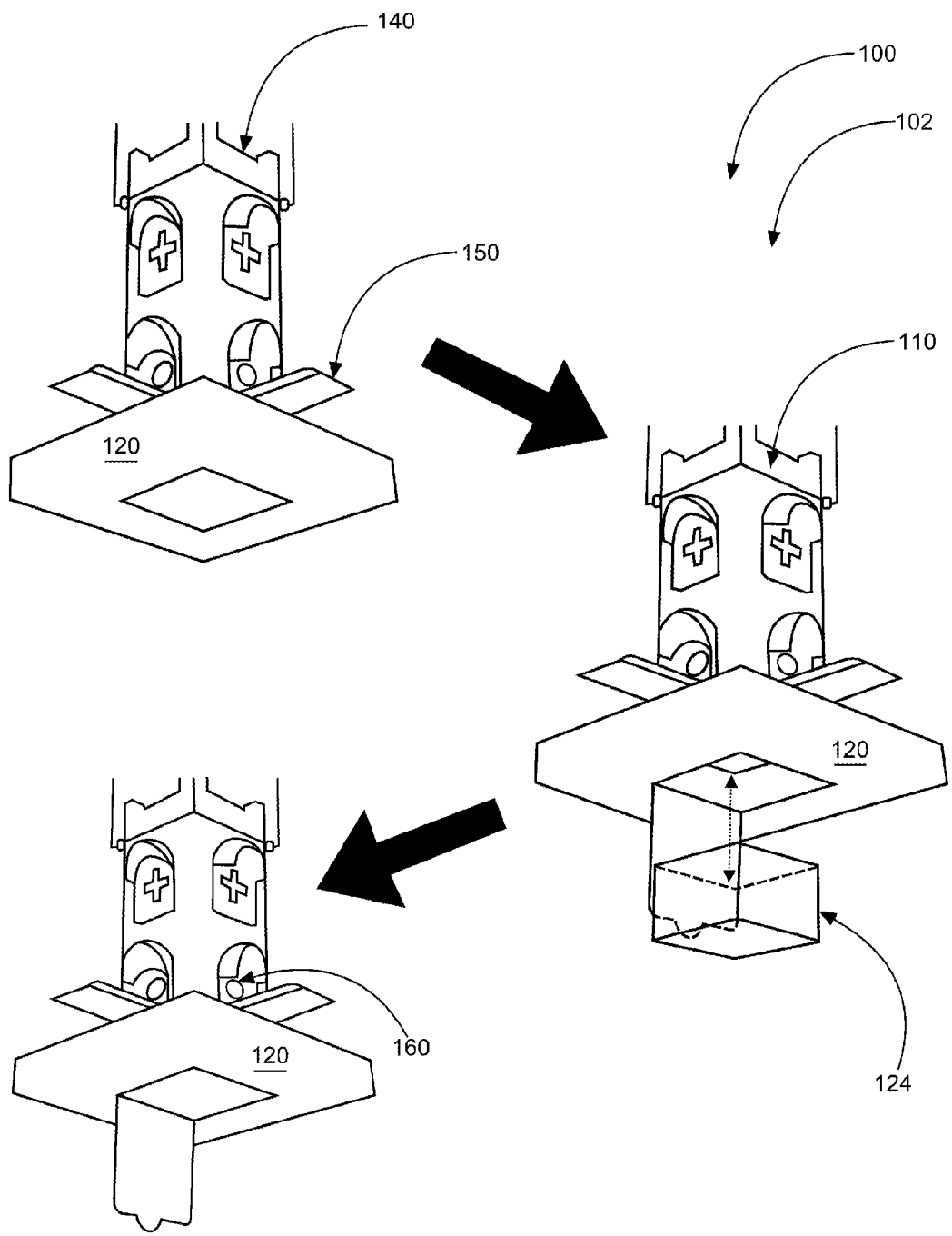
FIG. 6 is a perspective view illustrating the feed-saver birdfeeder as disassemblable according to an embodiment of the present invention of FIGS. 1-5.
Figure 7:
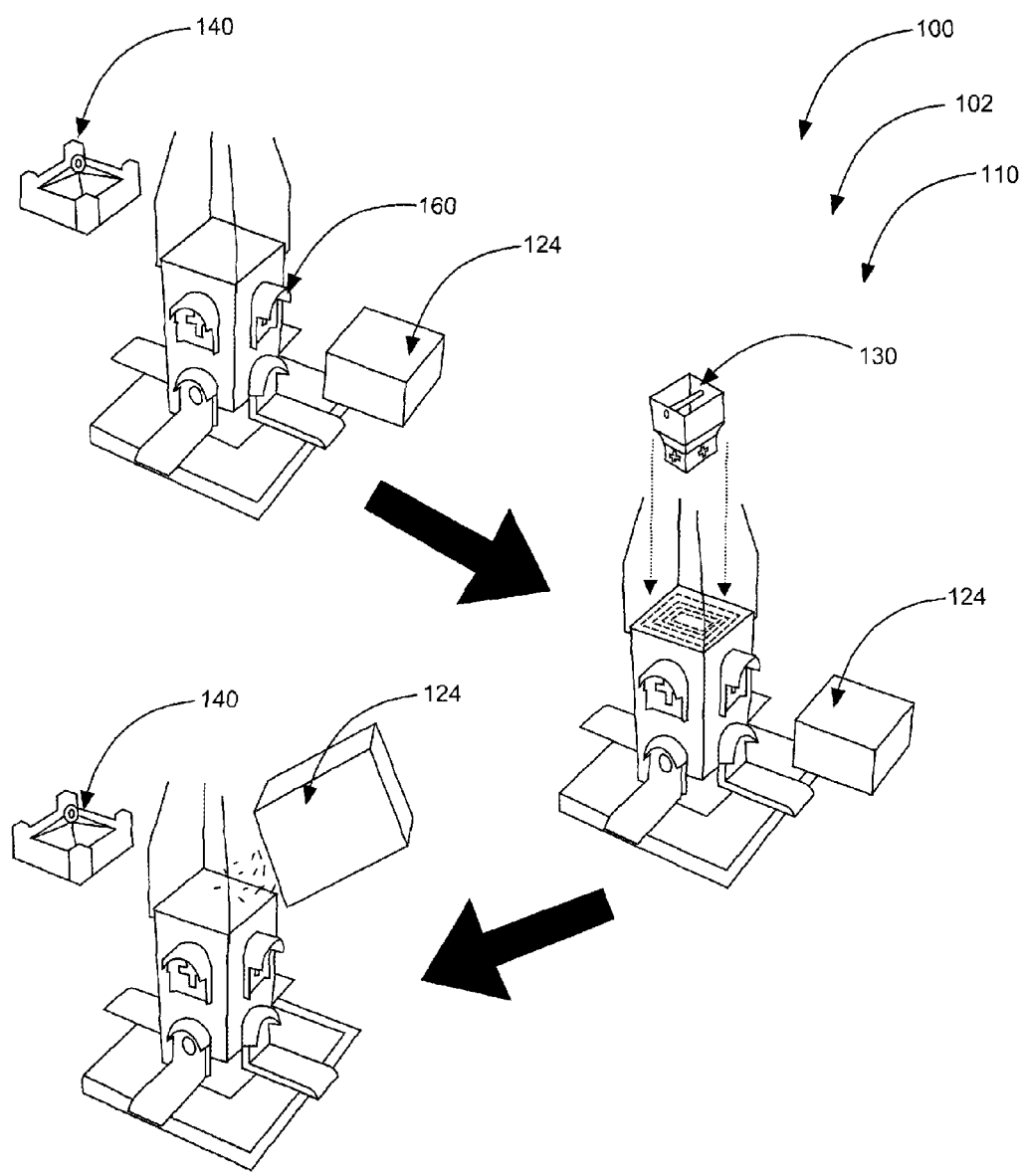
FIG. 7 is a perspective view illustrating the feed-saver birdfeeder as refilled according to an embodiment of the present invention of FIGS. 1-6.

Referring now to FIGS. 1-7 showing perspective views of castle birdfeeder systems 100 according to embodiment(s) of the present invention. Castle birdfeeder systems 100 preferably comprises feed-saver birdfeeder 102. Feed-saver birdfeeder 102 preferably provides an efficient method for feeding wild birds while conserving bird seed.

Feed-saver birdfeeder 102 preferably includes housing assembly 110 with multiple (preferably three removable—seed holder 130 for holding seeds; removable roof 140 having solar powering means; and seed catcher) compartments also preferably having, moat-base 120; a plurality of hinged perch doors 150; a plurality of seed access (windows) holes 160; mounted solar panel 170; at least one illuminator 174; at least one (preferably four) squirrel-proof rings 180; at least one hanger 190 for hanging feed-saver birdfeeder 102 in a suspended position; and at least one awning 164 over each of seed access holes 160 to substantially prevent water from entering seed access holes 160. It should be understood that seed access holes 160 comprise windows and are referred to interchangeably throughout this disclosure.

Housing assembly 110 may be transparent and preferably comprises a stone castle profile. Feed-saver birdfeeder 102 may be disassemblable for cleaning and preferably comprises a triple seed-saver. Birds are able to eat the seeds and loss of the seeds is substantially prevented by feed-saver birdfeeder 102. When a user disassembles feed-saver birdfeeder 102, a user may remove seed holder 130 and pour any retrieved seeds back into fillable seed holder 130. Fresh seeds may also be poured into (fillable) seed holder 130 to supplement the retrieved seeds, and feed-saver birdfeeder 102 can be re-assembled and returned to its previous location.

Moat-base 120, removable roof 140, seed catcher, and (removable) seed holder 130 define an inner volume of housing assembly 110, as shown (preferably effectively waterproof.) Further, moat-base 120, hinged perch doors 150 and plurality of seed access holes 160 comprise seed-savers by substantially preventing seeds from falling on the ground. Moat-base 120 is preferably rectangular and is about ¼ inch deep. Moat-base 120 can be filled about half-way with a fluid such as water in which the birds can drink, clean and cool therein. Further, moat-base 120 comprises seed collector 124 when the seeds are dropped by the birds.

Hinged perch doors 150 provide a rest for birds while eating the seeds from seed access (windows) holes 160 accessing the seeds from seed holder 130. The birds may land on and rest on hinged perch doors 150 to access the seeds when hinged perch doors 150 are rotated to a down-position to provide at least one rest for the birds while eating the seeds from the seed holder 130 through access holes 160 accessing the seeds from seed holder 130. Hinged perch doors 150 may be rotated to an up-position to substantially prevent access to seed access holes 160.

Seed access holes 160 (windows) preferably each comprise a diameter of about 1 inch such that other animals are prevented from accessing the seeds with ease. Further, seed holders 160 comprise one quarter inch cross-shaped opening the birds access the seeds from fillable inner seed container 130. The present design of the cross-shaped opening helps keep the seed in place, and helps birds grasp the seeds one at a time instead of free-feeding. Removable roof 140 provides a weather-proof enclosure to substantially prevent the seeds from getting wet while stored in fillable inner seed container 130. Located around a periphery of (each of) seed access holes 160 is at least one squirrel-proof ring 180 to prevent squirrels from accessing and stealing the seeds. Squirrel-proof ring 180 may comprise a metal rod (or other suitably equivalent material.) This effectively prevents the squirrels from chewing the seed access holes 160 open further such that they can access the seeds.

Mounted solar panel 170 and (one or more) illuminators 174 are preferably in electrical communication to provide illumination to help birds locate the seeds during periods of darkness. During daylight hours, removable roof 140 may absorb and store solar energy to power a light on the underside of removable roof 140. This can allow the light to illuminate feed-saver birdfeeder 102 to help birds locate the food in the dark. As birds eat, any excess seeds may fall from feed-saver birdfeeder 102 to the seed catcher placed directly below.

A kit may be arranged for sale including the various components described above and the preferred seeds/feed and a set of user instructions. A method of use may also include: installing feed-saver birdfeeder 102; filling with seeds; optionally refilling with seeds as eaten by the birds; disassembling and cleaning feed-saver birdfeeder 102; and reassembling feed-saver birdfeeder 102 for use again as detailed above.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A feed-saver birdfeeder comprising:
   a housing assembly with multiple detachable compartments having,
      a seed holder for holding seeds;
      a removable seed catcher;
      a removable roof;
      a moat-base;
      a plurality of hinged perch doors;
      a plurality of seed access windows;
   wherein said removable seed catcher, said removable roof, and said seed holder define an inner volume of said housing assembly;
   wherein said moat-base, said hinged perch doors and said plurality of seed access windows comprise seed-savers by substantially preventing seeds from falling on the ground;
   wherein said hinged perch doors provide a rest for birds while eating said seeds from said seed access windows accessing said seeds from said seed holder; and
   wherein said birds are able to eat said seeds and loss of said seeds is substantially prevented by said feed-saver birdfeeder.

2. The feed-saver birdfeeder of claim 1 wherein said housing assembly is transparent and comprises a stone castle profile.

3. The feed-saver birdfeeder of claim 1 further comprising a solar panel and illuminators to help birds locate said seeds during periods of darkness.

4. The feed-saver birdfeeder of claim 1 further comprising at least one squirrel-proof ring located around a periphery of holes of said seed access windows to prevent squirrels from accessing and stealing said seeds.

5. The feed-saver birdfeeder of claim 1 wherein the birds may land on and rest on said hinged perch doors to access said seeds.

6. The feed-saver birdfeeder of claim 1 wherein said moat-base is rectangular and about one quarter deep.

7. The feed-saver birdfeeder of claim 1 wherein said moat-base can hold water and be used as a moat, in which said birds can drink, clean and cool therein.

8. The feed-saver birdfeeder of claim 1 wherein said feed-saver birdfeeder comprises a triple seed-saver.

9. The feed-saver birdfeeder of claim 1 wherein said removable roof provides a weather-proof enclosure to substantially prevent said seeds from getting wet while stored in said seed holder.

10. The feed-saver birdfeeder of claim 1 wherein said plurality of seed access windows comprise a diameter of about 1 inch.

11. The feed-saver birdfeeder of claim 1 wherein said plurality of seed access windows comprise a cross-shape.

12. The feed-saver birdfeeder of claim 1 wherein said moat-base comprises a seed collector when said seeds are dropped by said birds.

13. The feed-saver birdfeeder of claim 1 wherein said feed-saver birdfeeder is disassemblable for cleaning.

14. The feed-saver birdfeeder of claim 1 wherein said feed-saver birdfeeder further comprises awnings over each of said seed access windows.

15. The feed-saver birdfeeder of claim 1 wherein said awnings over each of said seed access holes substantially prevent water from entering said seed access windows.

16. The feed-saver birdfeeder of claim 1 wherein feed-saver birdfeeder further comprises at least one hanger.

17. The feed-saver birdfeeder of claim 4 wherein said squirrel-proof ring comprises a metal rod in a shape of a ring.

18. The feed-saver birdfeeder of claim 1 wherein said hinged perch doors are able to be rotated to an up-position to prevent access to said seed access windows.

19. The feed-saver birdfeeder of claim 1 wherein said hinged perch doors are able to be rotated to a down-position to provide said rest for said birds while eating said seeds from said seed access windows accessing said seeds from said seed holder.

20. A feed-saver birdfeeder comprising:
   a housing assembly with multiple removable compartments having,
      a moat-base;
      a seed holder for holding seeds;
      a removable roof;
      a plurality of hinged perch doors;
      a plurality of seed access holes;
      a mounted solar panel;
      at least one illuminator;
      four squirrel-proof rings;
      at least one hanger for hanging said feed-saver birdfeeder in a suspended position;
      at least one awning over each of said seed access holes;
   wherein said moat-base, said removable roof, and said removable seed holder define an inner volume of said housing assembly;
   wherein said housing assembly is transparent and comprises a stone castle profile;
   wherein said mounted solar panel and said illuminator(s) are in electrical communication to provide illumination to help birds locate said seeds during periods of darkness;
   wherein said at least one squirrel-proof ring is located around a periphery of said seed access holes to prevent squirrels from accessing and stealing said seeds;
   wherein said feed-saver birdfeeder further comprises awnings over each of said seed access holes;
   wherein said awnings over each of said seed access holes substantially prevent water from entering said seed access holes;
   wherein the birds may land on and rest on said hinged perch doors to access said seeds when said hinged perch doors are rotated to a down-position to provide at least one rest for said birds while eating said seeds from said seed access holes accessing said seeds from said seed holder;
   wherein said hinged perch doors are able to be rotated to an up-position to substantially prevent access to said seed access holes;
   wherein said hinged perch doors provide a rest for said birds while eating said seeds from said seed access holes, accessing said seeds from said seed holder;
   wherein said squirrel-proof ring comprises a metal rod;
   wherein said moat-base is rectangular;

wherein said moat-base can be filled with water in which said birds can drink, clean and cool therein;

wherein said moat-base, said hinged perch doors and said plurality of seed access holes comprise seed-savers by substantially preventing seeds from falling on the ground;

wherein said moat-base comprises a seed collector when said seeds are dropped by said birds;

wherein said removable roof provides a weather-proof enclosure to substantially prevent said seeds from getting wet while stored in seed holder;

wherein said plurality of seed access holes each comprise a diameter of about 1 inch;

wherein said plurality of seed access holes comprise a cross-shape;

wherein said feed-saver birdfeeder is disassemblable for cleaning;

wherein said feed-saver birdfeeder comprises a triple seed-saver; and wherein said birds are able to eat said seeds and loss of said seeds is substantially prevented by said feed-saver birdfeeder.

* * * * *